Feb. 2, 1943.  D. A. DEARLE  2,309,830
ATTACHMENT FOR BIRD CAGE
Filed Aug. 24, 1940
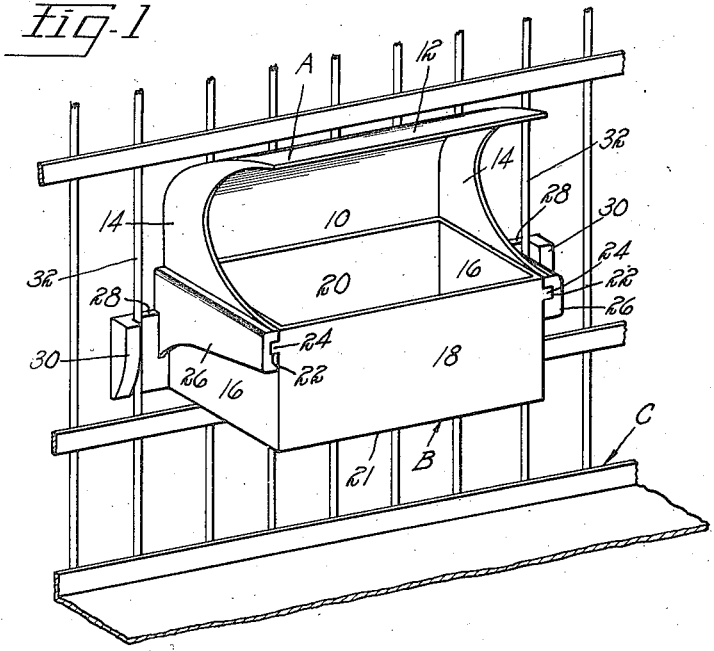
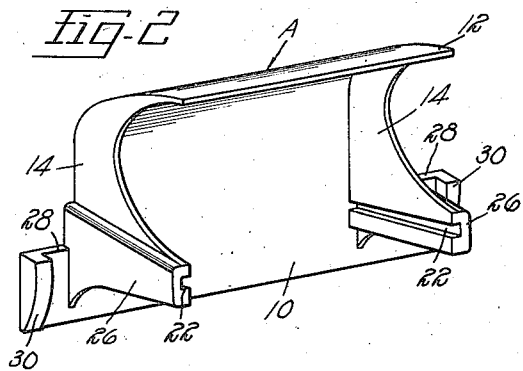
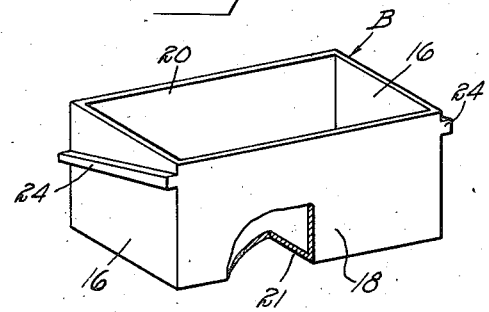
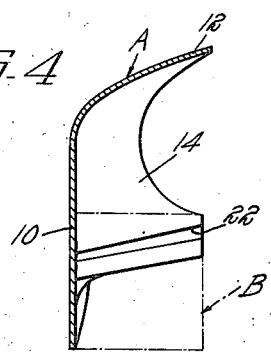
Inventor
DENIS A. DEARLE
By Lindsey & Blanchard
Attorneys Patented Feb. 2, 1943

2,309,830

UNITED STATES PATENT OFFICE 2,309,830

ATTACHMENT FOR BIRD CAGES

Denis A. Dearle, New Britain, Conn., assignor to North and Judd Manufacturing Company, New Britain, Conn., a corporation of Connecticut Application August 24, 1940, Serial No. 353,994

1 Claim. (Cl. 119—18)

The present invention relates to bird cage attachments and more particularly to that type of an attachment employed as a feeding device having a reservoir or feedbox for storing water or seed from which birds may feed.

Heretofore, attachable feeding devices have been constructed in numerous ways but difficulty has been encountered in refilling and thereafter reattaching them to the cage without spilling the seed or water.

Another object is to so mount the feed box upon the supporting member that the box cannot be jarred or shaken from its secured position.

A still further object is to provide a feeding device of the above indicated type which may be economically manufactured of a moldable plastic and in use accomplishes the above objects in a simple manner.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claim.

In the accompanying drawing:

Figure 1 is a perspective view of a two-part feeding device secured to the bar members of a bird cage;

Fig. 2 is a perspective view of the supporting member of the feeding device;

Fig. 3 is a perspective view of the feed box removed from the supporting member; and Fig. 4 is a cross-sectional view of the supporting member taken through the center of Fig. 2 and indicating in dotted lines the position the box takes therein.

The present invention comprises generally a feeding device having a supporting member A adapted to be detachably secured to a bird cage C, and an independent feed box member B slidably secured to the supporting member A. The members A and B are formed of moldable plastic in the present instance, but may be made of any suitable material.

In the embodiment illustrated, the support A comprises a substantially rectangular back wall 10 having its upper portion curved forwardly to provide a hood portion 12 adapted to overhang the feed box, as is hereinafter apparent. Formed integral with the wall 10 and extending forwardly from each side edge thereof are side walls 14 between which the feed box is positioned.

The feed box B comprises an open top rectangular box having end walls 16, front and rear walls 18 and 20, and a bottom 21. The length of the box is such that when inserted between the side walls 14 of the support A the end walls 16 lie closely adjacent thereto and the rear wall 20 contacts the back wall 10 thereof.

In order to secure the box B to the support A, the lower portions of the side walls 14 are provided with oppositely disposed grooves 22 which slidably receive corresponding oppositely disposed supporting runners 24 provided on the end walls 16 of the box. As indicated, the grooves 22 and cooperating runners 24 are pitched rearwardly and downwardly so that if the assembly is shaken or jarred, the box, because of its weight, will always tend to slide downwardly and thereby position its rear wall 20 against the back wall 10 of the support A.

In order to prevent rattling between the box and the support and at the same time make the former easily insertable into the latter, the grooves 22 and runners 24 are correspondingly tapered from front to rear. By providing this taper the rear portion of the runners 24, which are relatively narrow, are easily inserted into the wider front portion of the groove 22, the clearance therebetween becoming smaller as the rear wall 20 of the box approaches the back wall 10 of the support, when the clearance becomes so small that frictional engagement will prevent rattling.

By the above described construction, there is thus formed a feeding device having an overhanging portion 12 designed to prevent the birds or other pets, feeding from said device, from bodily entering the box and thereby scattering or fouling the feed therein. Refilling of the device is easily accomplished by merely sliding the box from the supporting member. When the box is repositioned in the support, the rearward and downward slope of groove 22 and cooperating sliding members 24 insure the box being positively retained in its normal feed dispensing position at all times.

As previously indicated the box B and support A are formed of moldable plastic. For economic reasons the structures are made as thin as possible. In order to give greater strength to side walls 14, which would be obviously weaker at the grooves 22, there are provided reinforcing shoulders 26 on the walls outwardly of the grooves.

The device may be secured to the bird cage in any desired manner, in the present instance this is accomplished by providing lateral wings 28 extending from the back wall 10 of the support A and having forwardly extending lugs 30 on their outer extremities. Support A may be fastened to the wire bars 32 of a bird cage C by positioning the securing members 28 rearwardly of said bars, as illustrated in Figure 1 of the drawing, the lugs 30 acting to prevent lateral movement of the device when so positioned on the cage.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

I claim as my invention:

A bird cage attachment comprising a support, said support including a rear wall having its upper end curved forwardly to provide a hood, and side walls extending outwardly from the edges of said rear wall, a rectangular feed box having end walls positionable between the side walls of said support, the side walls of said support having rearwardly and downwardly sloped tapered grooves, and the end walls of said box having correspondingly sloped tapered runners receivable in said grooves for removably holding the box in said support, and means for attaching the support to a cage.

DENIS A. DEARLE.